Sept. 25, 1951  H. W. SANFORD  2,569,023
VALVE
Original Filed Jan. 14, 1941
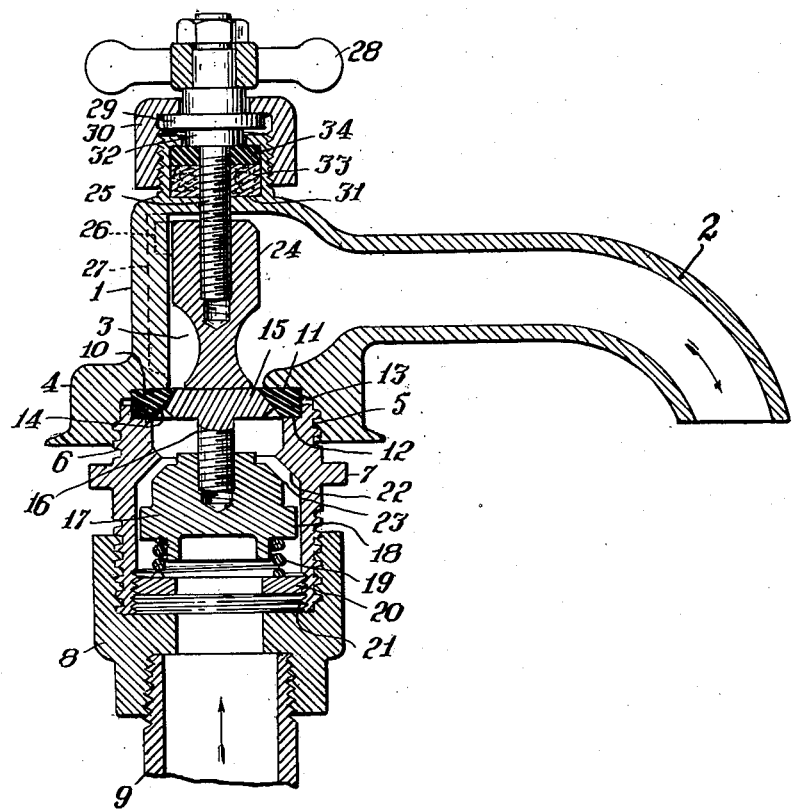
Inventor
Hugh W. Sanford
By Cyrus Kehr & Smecker
Attorneys Patented Sept. 25, 1951

2,569,023

UNITED STATES PATENT OFFICE 2,569,023

VALVE

Hugh W. Sanford, Knoxville, Tenn.

Original application January 14, 1941, Serial No. 374,388, now Patent No. 2,388,710, dated November 13, 1945. Divided and this application November 13, 1945, Serial No. 628,277

2 Claims. (Cl. 251—50)

This application is filed as a division of my application on Valves, Serial No. 374,388, filed January 14, 1941, now Patent No. 2,388,710, dated November 13, 1945.

This invention relates to an improvement in valves of the character of faucets, globe valves, check-valves, and the like, and relates more particularly to packing or sealing devices which seal connected parts of the valve structure, such as the rotatable valve stem, against the leakage of fluid.

The object of the invention is to improve the construction and arrangement of such sealing devices and valve seats for obtaining more effective and secure sealing action thereby, in a simple and yet inexpensive manner, particularly by the use of a sealing washer or gasket, which is pinched in place to constitute an effective fluid tight seal when in place between opposed or connected portions of the valve.

A further object of the invention is to provide an effective seal for the valve stem, particularly a non-rising valve stem, that will act by the force of fluid acting thereon to increase the sealing action.

It is preferred to accomplish these objects, according to one embodiment of the invention, by providing a gasket overlapping opposite sides of a crack between the valve stem and the casing and yieldably held thereagainst in position for pressure of the gasket thereover by pressure of the fluid acting thereon.

This embodiment is shown in the accompanying drawing, which is a vertical sectional view through a faucet.

The invention is shown in the drawing as applied to a faucet having a main body 1 with a laterally directed spout 2 in communication with a chamber 3 in the body 1.

The lower end portion of the body 1 is provided with a ring 4 formed thereon and internally screw-threaded at 5 to receive therein the upper end of a sleeve 6, which upper end is externally screw-threaded to have a relatively loose screw connection with the threaded portion 5 of the ring 4, capable of being coupled and uncoupled by manual rotation. A flange 7 is formed on the sleeve 6 and preferably square or hexagon or other shape to facilitate grasping thereof for turning of the sleeve 6 or for holding the same while unscrewing the body 1 therefrom.

The lower end portion of the sleeve 6 is threaded into the upper end of a pipe reducer 8, which in turn, is screw-threaded with a pipe 9 adapted to be connected with a source of fluid under pressure for supplying fluid to the faucet.

Interposed between the adjacent ends of the body 1 and sleeve 6 is a ring 10, forming a gasket, seated in grooves 11 and 12 in said parts 1 and 6 in position to overlap a crack 13 therebetween. When the body 1 is screwed up on the end of the sleeve 6, the ring 10 is pinched therebetween in said overlapping relation with opposite sides of the crack 13 to form an effective seal thereover and to prevent the leakage of fluid through the crack to the threaded connection between the parts 1 and 6, whereby said threaded connection may be relatively loose for manual screwing up and unscrewing thereof.

The gasket 10 fits snugly against the side walls surrounding it and the pinching effect is applied so that the radial pressure of the fluid will expand the gasket 10 radially so as to seal the outlet crack between the seats 11 and 12. The ring 10 is constructed preferably of yieldable material, such as soft rubber, rubber-like material, cork, or the like, that will yield sufficient for a pinching action between the parts of the faucet, and yet will effectively seal the overlapped edges of the crack 13.

The pinching pressure between the seats 11 and 12 is not relied upon to cause the final sealing, but this pinching pressure merely starts the radial expansion of the gasket 10, so that, whatever the internal pressure may be, the joint 13 will not leak, because the greater the internal pressure, the greater will be the radial expansion of the gasket 10 and the more effectively it will seal the crack 13.

The ring 10 serves also as a valve seat, having a conical seating surface 14 at the inner underside thereof to receive a valve body 15 thereagainst. This relation of conical surfaces tends to begin the radial expansion of the gasket 10, and also facilitates keeping the valve seat surface clean, so that pebbles, scales, and other foreign matter do not tend to lodge between the valve body and seat and cause leakage when the valve is seated, and also because the fluid going through the faucet tends to wash out any dirt that might collect on this seat, whereas if the seat was not tapered there would be a tendency for the dirt to collect and cause the valve to leak.

The valve body 15 has a depending pin 16 extending therefrom and screw-threaded into a plunger 17 slidably mounted in the sleeve 6 and capable of adjustment by the screw-threaded connection with the pin 16 toward and from the valve body 15. The periphery of the plunger 17 has radial guide flanges 18 thereon for centering the plunger 17 in the sleeve while allowing freedom of axial movement relative thereto and spacing the plunger from the surrounding wall of the sleeve for free flow of fluid thereby. The plunger is normally pressed in an upward direction by a coiled spring 19 interposed between the lower end of the plunger and a washer 20 screw-threaded into the lower end portion of the sleeve 6 which is threaded at 21 to receive said washer. The force of the fluid acting on the plunger 17 together with the pressure of the spring 19, tend to maintain the valve 15 seated, until the same is forcefully unseated as hereinafter described.

The sleeve 6 is provided with an internal valve seat 22 therein in position to be engaged by a conical valve portion 23 formed on the upper edge of the plunger 17, but the connection between said plunger and the pin 16 is preferably such as will maintain the surfaces 22 and 23 separated, as shown in Fig. 1, when the valve 15 is in its normal seated position. However, when the body 1 is removed from the sleeve for replacement of the ring 10, the valve surface 23 on the plunger 17 engages the seat 22 to seal off the source of fluid under pressure and prevent discharge or leakage thereof, during the replacement of the ring 10.

The valve 15 is adapted to be unseated by engagement of the upper surface thereof with a nut 24, having screw-threaded connection with a valve stem 25. The nut 24 is elongated and has a lower end shaped to abut against the upper surface of the valve body 15, and it is formed with a radially projecting rib 26 thereon received in a groove 27 in the faucet body 1 to hold the nut 24 against turning movement during the rotation of the valve stem 25.

The upper end portion of the valve stem 25 has secured thereon a handle 28, beneath which is a collar 29 rotatably mounted in a cap piece 30 screw-threaded rigidly on the faucet body 1.

The faucet body 1 has a recess 31 in the upper end thereof surrounding the opening for the valve stem 25, which recess 31 receives in the upper end thereof a hub 32 on the stem 25 that supports the collar 29, said collar being journaled on the non-threaded upper end portion of the valve stem 25 and cooperating with the cap piece 30 to form a thrust bearing for the valve stem. The recess 31 is partially filled with yieldable fibrous material 33, such as felt under compression, which is surmounted by a gasket 34 that overlaps the adjacent edges of the recess 31 and the hub 32, covering the crack therebetween, spanning opposite sides thereof, and forming a check-valve over said crack to prevent the leakage of fluid therethrough. The gasket 34 may be formed of soft rubber or other suitable material of the character of the ring 10.

Rotation of the valve stem 25 by the handle 28 causes axial movement of the nut 24 to press downward on the valve body 15 against the tension of the spring 19 and the pressure of the fluid in the pipe 9, to unseat the valve body and allow flow of the fluid through the faucet. When the handle 28 is turned in the opposite direction, the pressure of the nut 24 on the valve body 15, is withdrawn, and the pressure of the fluid acting on the plunger 17, alone or with the spring pressure 19, effectively seats the valve 15 and stops the force of the fluid flow through the faucet.

Any fluid under pressure which leaks out of the faucet along the valve stem 25, which extends loosely through the top of the casing will act against the under face of the gasket 34, which is held over the crack by the yieldable packing 33. The pressure of this fluid acting against the gasket increases the sealing action of the gasket.

I claim:

1. In a valve structure, a body adapted to receive fluid under pressure for flow through the body, said body having a valve passageway therethrough with a valve seat therein for flow of fluid therethrough, a valve in the body in position to engage the seat, a valve stem connected with the valve and extending through a side of the body to a point externally thereof, said body and valve stem having adjacent inwardly facing and radially aligned faces at the point of projection of the stem from the body, which faces are arranged with a crack therebetween, an annular flexible yieldable gasket externally of the valve passageway and internally of the body around the stem and arranged in overlapping relation across the crack and in position for action of fluid pressure from within the body thereagainst over the crack and on opposite sides of the crack for sealing said crack against the leakage of fluid therethrough.

2. In a valve structure, a body adapted to receive fluid under pressure for flow through the body, said body having a valve passageway therethrough with a valve seat therein for flow of fluid therethrough, a valve in the body in position to engage the seat, a valve stem connected with the valve and extending through a side of the body to a point externally thereof, said body and valve stem having adjacent inwardly facing and radially aligned faces at the point of projection of the stem from the body, which faces are arranged with a crack therebetween, an annular flexible non-metallic yieldable gasket externally of the valve passageway and internally of the body around the stem and arranged in overlapping relation across the crack and in position for action of fluid pressure from within the body thereagainst over the crack and on opposite sides of the crack for sealing said crack against the leakage of fluid therethrough, and resilient means bearing against said gasket tending to hold the same pressed against the aligned faces at opposite sides of the crack.

HUGH W. SANFORD.

REFERENCES CITED

The following references are of record in the file of this patent:

UNITED STATES PATENTS

| Number | Name | Date |
| --- | --- | --- |
| 611,994 | Cook | Oct. 4, 1898 |
| 696,434 | Hedges | Apr. 1, 1902 |
| 1,361,059 | Hoff | Dec. 7, 1920 |
| 1,452,811 | Mueller | Apr. 24, 1923 |
| 2,388,710 | Sanford | Nov. 13, 1945 |

FOREIGN PATENTS

| Number | Country | Date |
| --- | --- | --- |
| 198,029 | Great Britain | May 22, 1923 |